(12) United States Patent
Ahn et al.

(10) Patent No.: US 11,824,153 B2
(45) Date of Patent: Nov. 21, 2023

(54) CARRIER FOR BATTERY CELL

(71) Applicants: SK On Co., Ltd., Seoul (KR); Hana Technology Co., Ltd., Gyeonggi-do (KR)

(72) Inventors: Ji Eun Ahn, Daejeon (KR); Sang Jun Park, Daejeon (KR); Young Rae Oh, Daejeon (KR); Kang San Kim, Daejeon (KR); Jae Min Ryu, Daejeon (KR); Ho Jeong Lee, Gyeonggi-do (KR)

(73) Assignees: SK ON CO., LTD., Seoul (KR); Hana Technology Co., LTD., Gyeonggi-do (KR)

( * ) Notice: Subject to any disclaimer, the term of this patent is extended or adjusted under 35 U.S.C. 154(b) by 0 days.

(21) Appl. No.: 18/296,078

(22) Filed: Apr. 5, 2023

(65) Prior Publication Data
US 2023/0343985 A1    Oct. 26, 2023

(30) Foreign Application Priority Data

Apr. 7, 2022 (KR) .......................... 10-2022-0043354

(51) Int. Cl.
*H01M 10/04* (2006.01)
(52) U.S. Cl.
CPC ................ *H01M 10/0404* (2013.01)
(58) Field of Classification Search
None
See application file for complete search history.

(56) References Cited

U.S. PATENT DOCUMENTS

| 10,644,344 B1* | 5/2020 | Ye ........................ B65G 47/56 |
| 2022/0266398 A1* | 8/2022 | Kim ...................... H01M 10/04 |

FOREIGN PATENT DOCUMENTS

| EP | 3876324 A1 | 9/2021 |
| KR | 10-2042775 B1 | 11/2019 |
| KR | 10-2020-0139366 A | 12/2020 |
| KR | 102358131 B1 * | 3/2021 |
| KR | 10-2358127 B1 | 2/2022 |
| KR | 10-2358131 B1 | 2/2022 |
| KR | 10-2361748 B1 | 2/2022 |

OTHER PUBLICATIONS

KR102358131B1 translation (Year: 2021).*
Extended European Search Report for the European Patent Application No. 23166878.1 issued by the European Patent Office dated Aug. 30, 2023.

* cited by examiner

*Primary Examiner* — Pamela H Weiss
*Assistant Examiner* — Amanda Rosenbaum
(74) *Attorney, Agent, or Firm* — IP & T GROUP LLP

(57) ABSTRACT

A carrier includes a base assembly movably coupled to a transfer rail, a seating plate disposed above the base assembly and having a battery cell seated on an upper surface thereof, a pressurizing and fixing portion for fixing the battery cell to the seating plate by pressurizing the battery cell, and an elastic member for pressurizing the pressurizing and fixing portion toward the seating plate side, wherein the pressurizing and fixing portion is coupled to the base assembly to move in a first direction, which is a horizontal direction, and a second direction, which is a vertical direction.

8 Claims, 6 Drawing Sheets

CARRIER FOR BATTERY CELL

CROSS-REFERENCE TO RELATED APPLICATIONS

The application claims benefit of priority to Korean Patent Application No. 10-2022-0043354 filed on Apr. 7, 2022 in the Korean Intellectual Property Office, the disclosure of which is incorporated herein by reference in its entirety.

BACKGROUND

1. Field

The present disclosure relates to a carrier for transferring a battery cell while manufacturing a secondary battery.

2. Description of Related Art

Differently from a primary battery, a secondary battery may be charged and discharged, and may be applied to various fields such as a digital camera, a mobile phone, a laptop computer, a hybrid vehicle, and an electric vehicle. Recently, among secondary batteries, research on a lithium secondary battery having high energy density and discharge voltage has been actively conducted.

Generally, a lithium secondary battery may be manufactured in the form of a flexible pouch type battery cell, a rigid prismatic battery cell, or a cylindrical can-type battery cell.

These battery cells may be manufactured through various processes, and accordingly, a device for stably transferring a battery cell between processes has been necessary.

SUMMARY

An aspect of the present disclosure is to provide a carrier which may stably transport a battery cell while being manufactured.

According to an aspect of the present disclosure, a carrier includes a base assembly movably coupled to a transfer rail; a seating plate disposed above the base assembly and having a battery cell seated on an upper surface thereof; a pressurizing and fixing portion for fixing the battery cell to the seating plate by pressurizing the battery cell; and an elastic member for pressurizing the pressurizing and fixing portion toward the seating plate side, wherein the pressurizing and fixing portion is coupled to the base assembly to move in a first direction, which is a horizontal direction, and a second direction, which is a vertical direction.

The pressurizing and fixing portion may include a pressurizing member having at least a portion disposed above the seating plate and pressurizing the battery cell; and a connection member extending from the pressurizing member and disposed to face a side surface of the seating plate.

The carrier may further include a first moving portion including a first guide rail fixed to the base assembly and a first moving member coupled to the first guide rail and moving back and forth in the first direction; and a second moving portion including a second guide rail fixed to the first moving member and a second moving member coupled to the second guide rail and moving back and forth in the second direction, and the pressurizing and fixing portion is fixed and fastened to the second moving member.

The carrier may further include a plate coupling portion disposed between the seating plate and the base assembly and coupling the seating plate to the base assembly, and the elastic member includes a first elastic member having one end fastened to the pressurizing and fixing portion and the other end fastened to the first moving member and providing an elastic restoring force in the first direction; and a second elastic member having one end fastened to the plate coupling portion and the other end fastened to the first moving member and providing an elastic restoring force in the second direction.

The seating plate may include at least one groove corresponding to a shape of the battery cell, and at least a portion of the pressurizing and fixing portion pressurizes a portion of the battery cell disposed externally of the groove.

At least a portion of the base assembly may be disposed to face a driving portion disposed parallel to the transfer rail, and electromagnetically coupled to the driving portion.

The base assembly may include a magnetic unit disposed in a portion facing the driving portion.

The carrier may further include a brush coupled to the base assembly, having at least a portion in contact with a surface of the driving portion when the base assembly moves, and removing foreign substances remaining on the driving portion.

The carrier may further include a buffer member coupled to at least one of a foremost region and a rearmost region of the base assembly.

According to an embodiment of present disclosure, since the carrier moves by electromagnetic coupling with the driving portion, independent movement and control between separate carriers is possible.

In addition, the carrier of present embodiment does not include a separate driving unit for moving or fixing the battery cell. Therefore, since a cable for supplying electricity is not connected to the carrier, movement is possible without restrictions on the movement distance.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
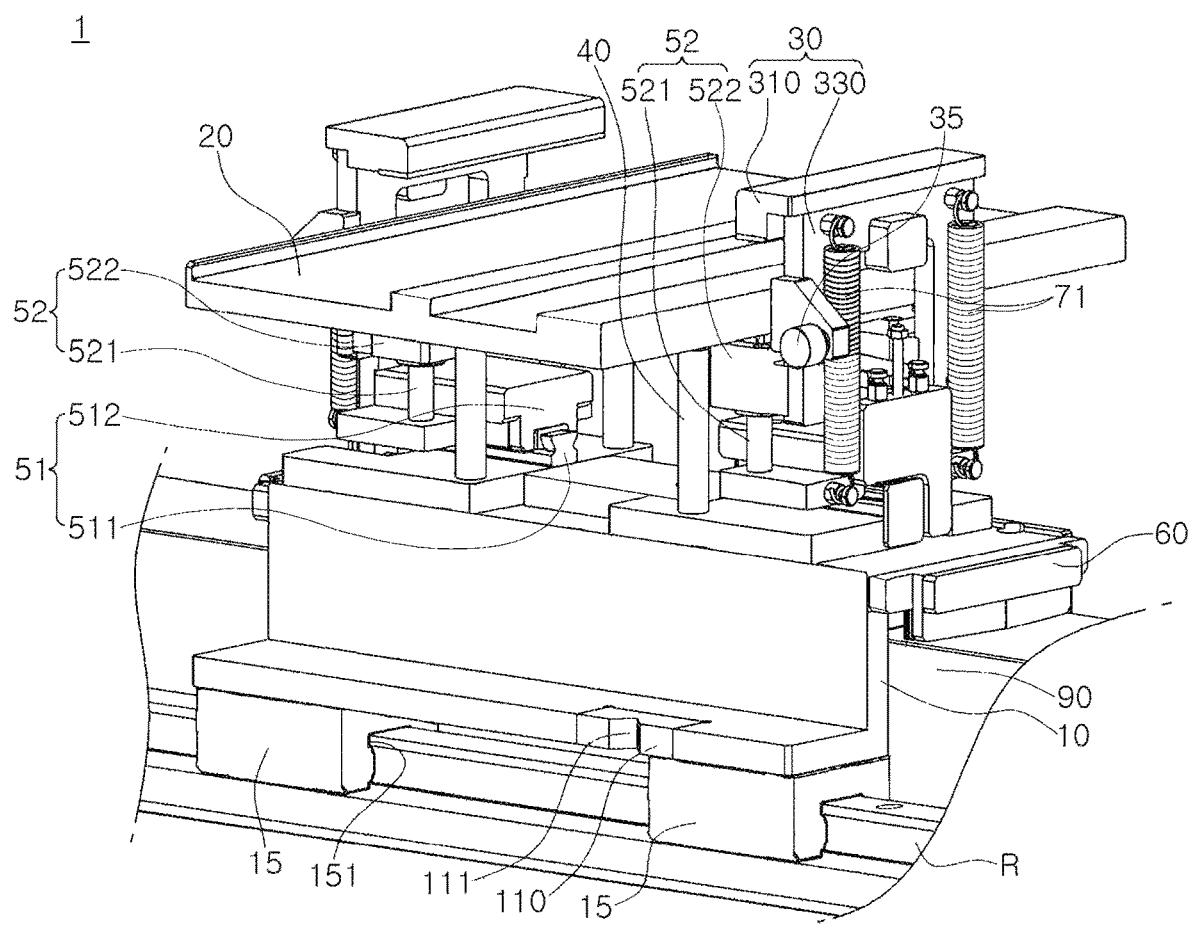
FIG. 1 is a perspective diagram illustrating a battery cell carrier according to an example embodiment of the present disclosure.

Hereinafter, embodiments of the present disclosure will be described as follows with reference to the attached drawings.

The present disclosure may, however, be exemplified in many different forms and should not be construed as being limited to the specific embodiments set forth herein. Rather, these embodiments are provided such that this disclosure will be thorough and complete, and will fully convey the scope of the disclosure to those skilled in the art. Accordingly, shapes and sizes of the elements in the drawings may be exaggerated for clarity of description. Also, elements having the same function within the scope of the same concept represented in the drawing of each example embodiment will be described using the same reference numeral.

In the drawings, same elements will be indicated by same reference numerals. Overlapping descriptions and detailed descriptions of known functions and elements which may unnecessarily make the gist of the present disclosure obscure will not be provided. In the accompanying drawings, a portion of elements may be exaggerated, omitted or briefly illustrated, and the sizes of the elements may not necessarily reflect the actual sizes of these elements.

In example embodiments, terms such as an upper side, an upper portion, a lower side, a lower portion, a side surface, a front surface, a rear surface, or the like, are represented based on the directions in the drawings, and may be used differently if the direction of an element is changed.

Figure 2:
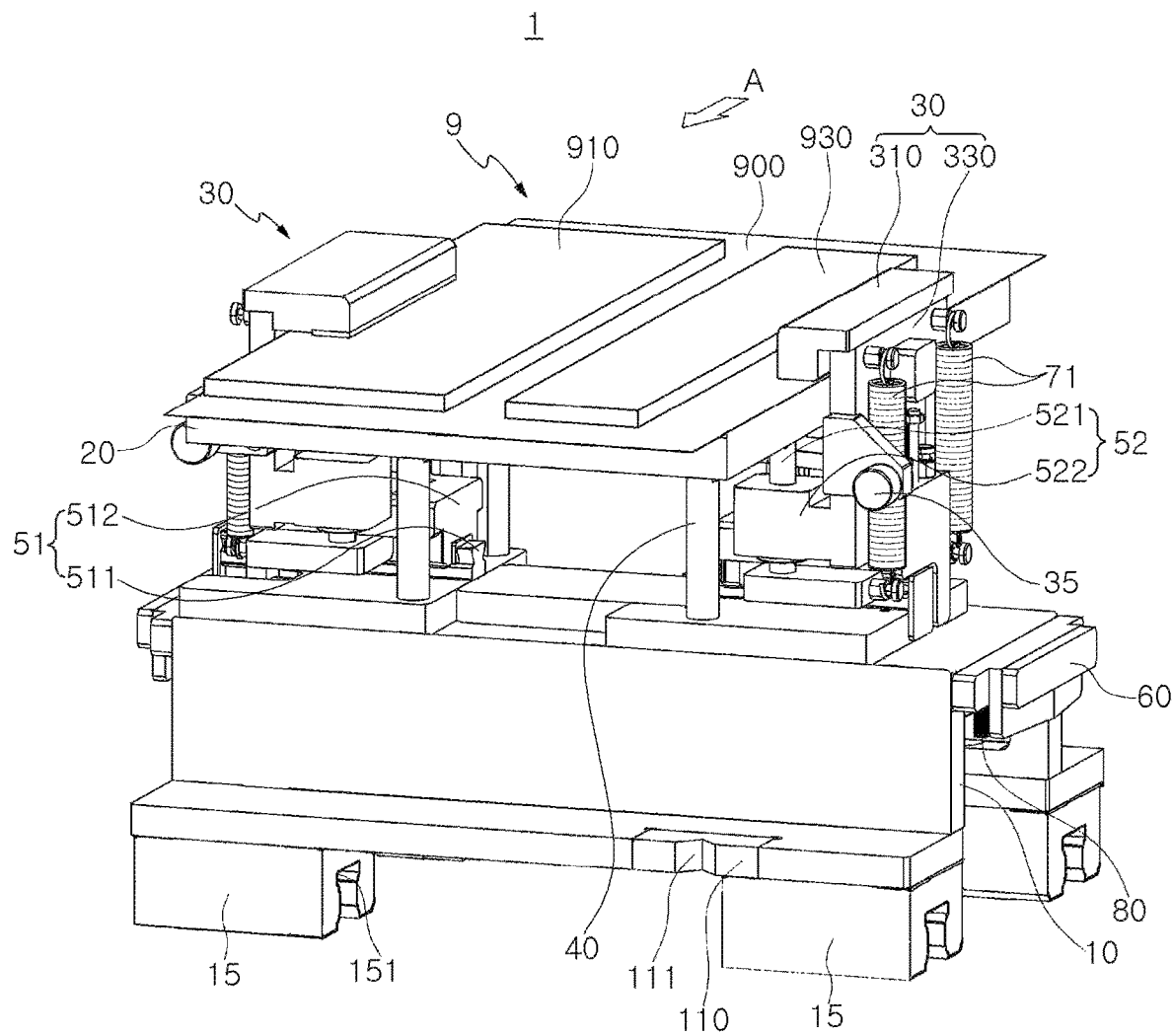
FIG. 2 is a perspective diagram illustrating a state in which a battery cell is fixed to the battery cell carrier illustrated in FIG. 1.
Figure 3:
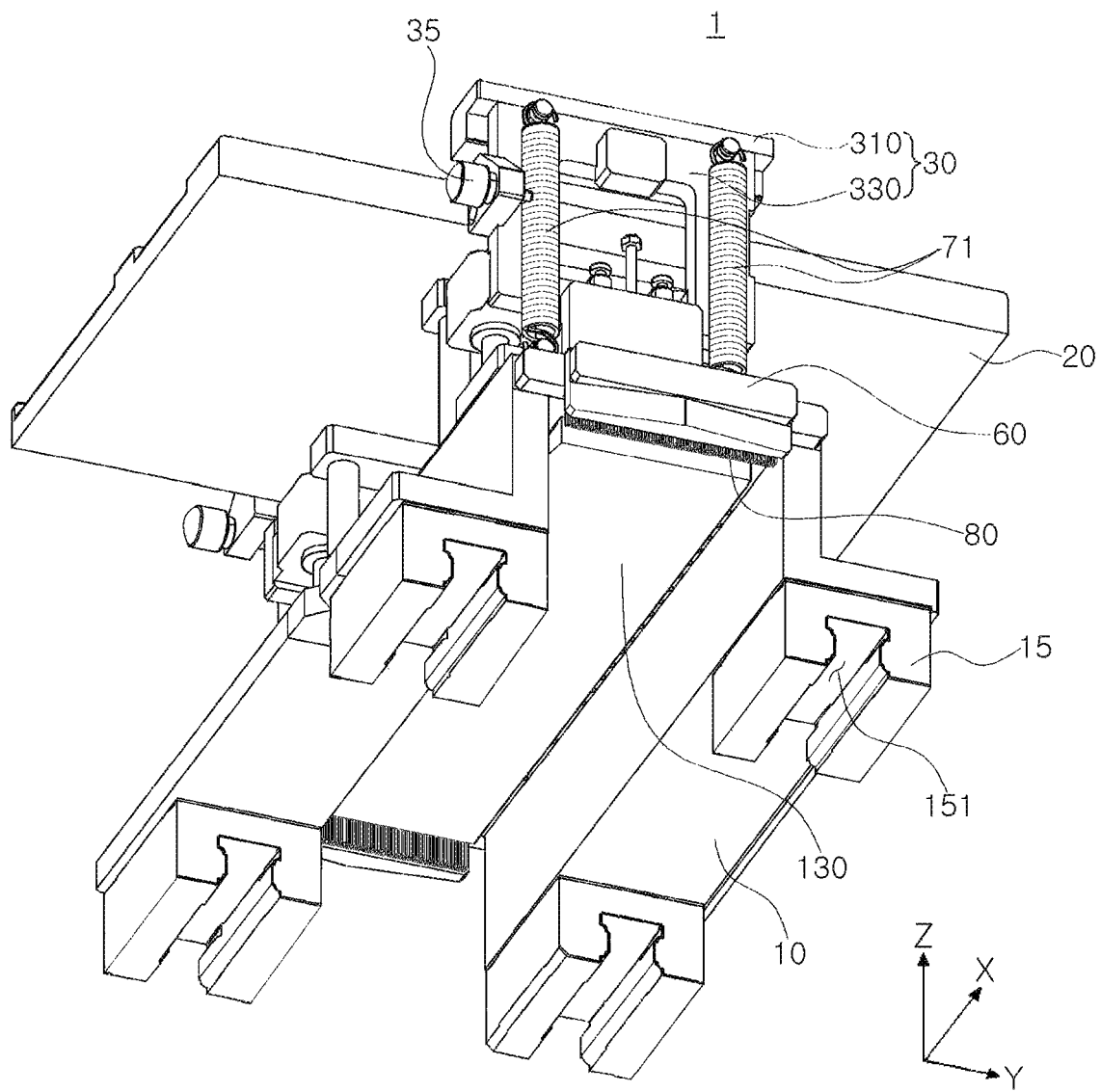
FIG. 3 is a perspective diagram illustrating the battery cell carrier illustrated in FIG. 2, viewed from below.

FIG. 1 is a perspective diagram illustrating a battery cell carrier according to an example embodiment. FIG. 2 is a perspective diagram illustrating a state in which a battery cell is fixed to the battery cell carrier illustrated in FIG. 1. FIG. 3 is a perspective diagram illustrating the battery cell carrier illustrated in FIG. 2, viewed from below.

Referring to FIGS. 1 to 3, the carrier 1 in the example embodiment may include a base assembly 10, a seating plate 20, a plate coupling portion 40, a pressurizing and fixing portion 30, a first moving portion 51 and a second moving portion 52.

The base assembly 10 may be included in a lower region of the carrier 1, and at least a portion thereof may be disposed to face a driving portion 90 to be described later.

The carrier 1 in the example embodiment may move using a linear motion system (LMS) method. More specifically, the carrier 1 in the example embodiment may be transported by a force interacting with the driving portion 90 disposed in a rail form in a moving direction of the carrier 1. The carrier 1 may move along the path in which the driving portion 90 is disposed through electromagnetic coupling with the driving portion 90. To this end, the driving portion 90 may include a plurality of coil units, and the base assembly 10 may include a magnetic unit 130 electromagnetically coupled to the coil units.

The magnetic unit 130 may be disposed to face a coil unit disposed in the driving portion 90. Accordingly, when current is sequentially applied to the coil units of the driving portion 90, the carrier 1 may move in the length direction of the driving portion 90 by attractive or repulsive force generated between the coil units and the magnetic unit 130.

The magnetic unit 130 may be disposed on the lower surface side of the base assembly 10 to face the upper surface of the driving portion 90, and may be disposed within a range in which electromagnetic coupling with coil units of the driving portion 90 may be possible.

Meanwhile, the coil unit may be disposed on the carrier 1 and the magnetic unit 130 may be disposed on the driving portion 90. However, in this case, the carrier 1 may need to include a cable for applying current to the coil unit, movement of the carrier 1 may be limited due to the cable.

Accordingly, in the example embodiment, the magnetic unit 130 may be disposed in the carrier 1, and the coil unit may be disposed in the driving portion 90.

A space into which the driving portion 90 may be inserted may be provided in the base assembly 10. For example, the base assembly 10 may be coupled to the driving portion 90 in a form surrounding at least one surface of the driving portion 90, and at least a portion of the driving portion 90 may be inserted into a space provided in the base assembly 10.

The driving portion 90 and the transfer rail R may be disposed below the base assembly 10.

The transfer rail R may define a moving path of the carrier 1. Accordingly, the carrier 1 may be coupled to the transfer rail R and may move along the transfer rail R.

In the example embodiment, two transfer rails R may be disposed parallel to the driving portion 90 on both sides of the driving portion 90. The carrier 1 may be coupled to two transfer rails R so as to move in the length direction of the transfer rail R. In this case, the driving portion 90 may be spaced apart from the base assembly 10 by a predetermine distance not to be in contact therewith, and may be disposed in a range in which electromagnetic coupling with the base assembly 10 may be possible.

A guide member 15 may be disposed on the lower surface of the base assembly 10. The guide member 15 may be movably coupled to the transfer rail R and may guide forward and backward movement of the carrier 1. A rail groove 151 having a shape complementary to the transfer rail R may be formed in the guide member 15 such that the transfer rail R may be inserted thereto. For example, the guide member 15 may be coupled to the transfer rail in the form of being engaged with the transfer rail R.

Also, the base assembly 10 may include at least one fixing member 110. The fixing member 110 may be provided to prevent the movement of the carrier 1 during the process when the carrier 1 is disposed in a process position.

The fixing member 110 may be detachably coupled to the base assembly 10 and may include an insertion groove 111 recessed inwardly.

An insertion member (not illustrated) may be inserted into the insertion groove 111. The insertion member may be provided in a device or a unit disposed externally of the carrier 1. Accordingly, when an insertion member is inserted into the insertion groove 111, the movement of the carrier 1 may be limited.

As the process is repeatedly performed, the fixing member 110 may be repeatedly in contact with the insertion member, and may be easily damaged. In consideration of this, the carrier 1 in the example embodiment may be coupled to the base assembly 10 such that the fixing member 110 may be detached. Accordingly, even when the fixing member 110 is damaged, only the fixing member 110 may be replaced without replacing the entire base assembly 10.

The fixing member 110 may be fastened to the base assembly 10 through a coupling means such as a bolt, but an example embodiment thereof is not limited thereto.

The seating plate 20 may be disposed above the base assembly 10. The battery cell 9 may be seated on the upper surface of the seating plate 20. Accordingly, the upper surface of the seating plate 20 may be flat or may be formed in a shape corresponding to the shape of the battery cell 9. For example, the seating plate 20 may have at least one groove corresponding to the shape of the battery cell 9.

Referring to FIG. 3, in the example embodiment, the battery cell 9 seated on the seating plate 20 may include a first accommodation portion 910 in which the electrode assembly is accommodated and a second accommodation portion 930 in which gas generated after inputting the electrolyte into the pouch 900 is gathered. Accordingly, the seating plate 20 may have a plurality of grooves on which the first accommodation portion 910 and the second accommodation portion 930 may be stably seated. However, an example embodiment thereof is not limited thereto.

The seating plate 20 may be disposed in a position spaced apart from the base assembly 10 by a predetermined distance, and may be fixed and fastened to the base assembly 10 via the plate coupling portion 40.

The plate coupling portion 40 may be disposed between the seating plate 20 and the base assembly 10, and may be coupled to the seating plate 20 and the base assembly 10. For example, the seating plate 20 may be coupled to the upper portion of the plate coupling portion 40, and the base assembly 10 may be coupled to the lower portion of the plate coupling portion 40. Accordingly, the seating plate 20 and the base assembly 10 may be spaced apart from each other by the size of the plate coupling portion 40.

In the example embodiment, the plate coupling portion 40 may include a plurality of pillars for supporting the seating plate 20. However, an example embodiment thereof is not limited thereto, and a component for supporting the seating plate 20 may be varied.

One end of a second elastic member 72 to be described below may be coupled to the plate coupling portion 40. Accordingly, a coupling protrusion coupled to the second elastic member 72 may be provided in the plate coupling portion 40. The coupling protrusion may be disposed between the plurality of pillars, but an example embodiment thereof is not limited thereto.

The pressurizing and fixing portion 30 may fix the battery cell 9 seated on the seating plate 20 to the seating plate 20 such that shaking or movement of the battery cell 9 may be prevented while the carrier 1 moves.

Figure 4:
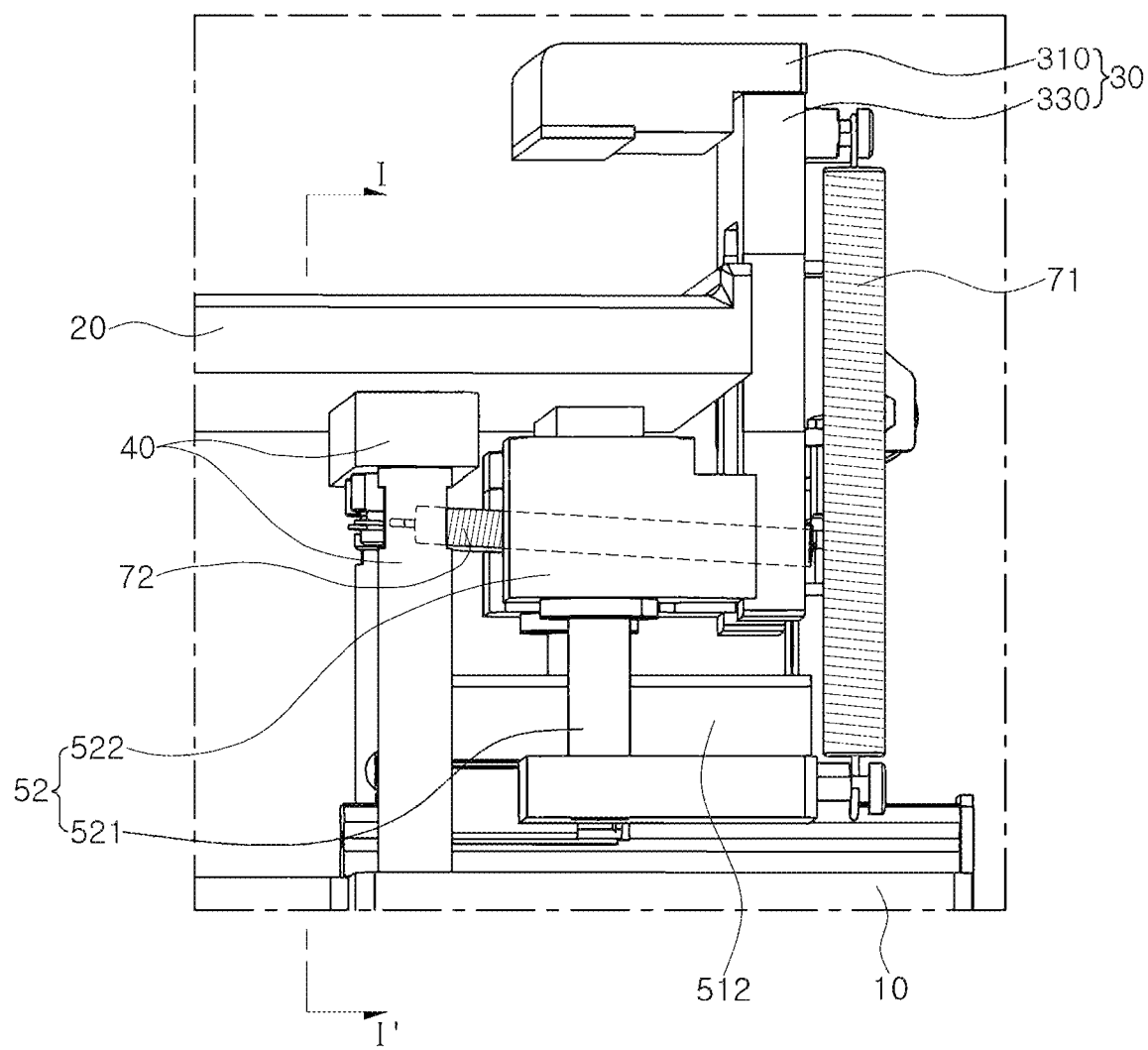
FIG. 4 is a perspective diagram illustrating a portion of a battery cell carrier in direction A in FIG. 2.
Figure 5:
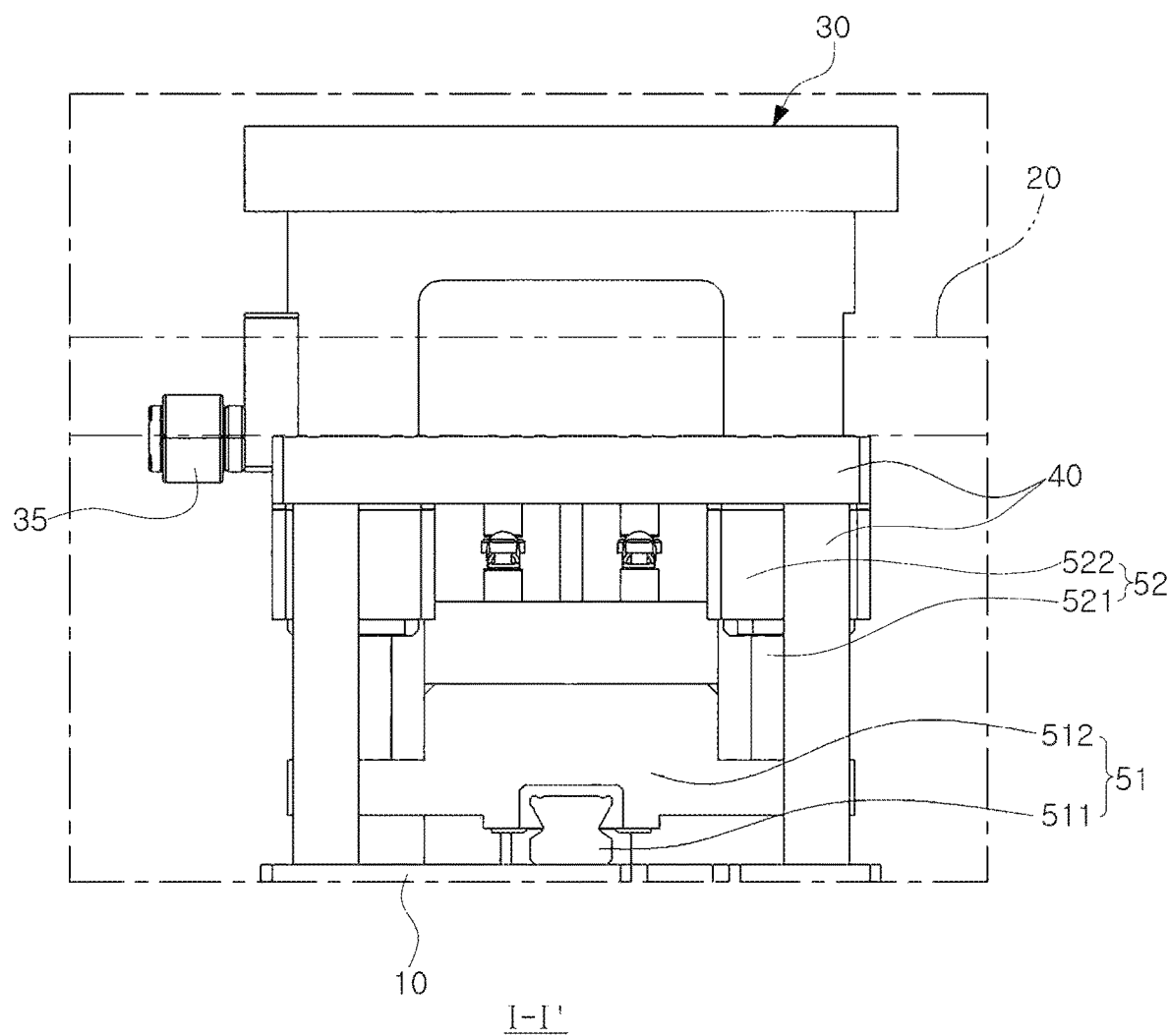
FIG. 5 is a cross-sectional diagram taken along line I-I' in FIG. 4.
Figure 6:
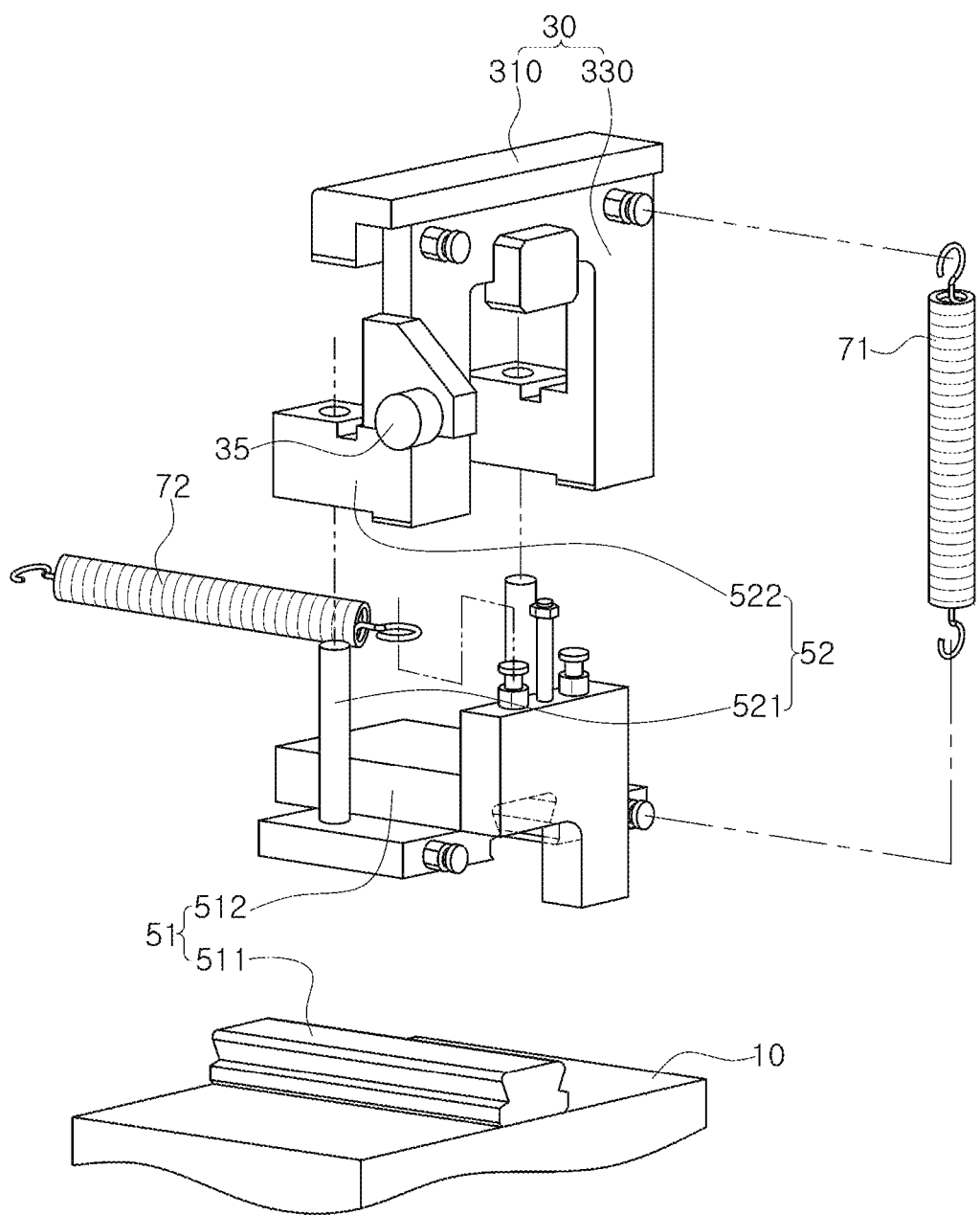
FIG. 6 is an exploded perspective diagram illustrating a portion of the battery cell carrier illustrated in FIG. 1.

FIG. 4 is a perspective diagram illustrating a portion of a battery cell carrier in direction A in FIG. 2. FIG. 5 is a cross-sectional diagram taken along line I-I' in FIG. 4. FIG. 6 is an exploded perspective diagram illustrating a portion of the battery cell carrier illustrated in FIG. 1. FIG. 6 partially illustrates only the pressurizing and fixing portion 30, the first and second moving portions 51 and 52, and the elastic members 71 and 72 for ease of description.

Referring to FIGS. 4 to 6 together, in the example embodiment, the pressurizing and fixing portion 30 may pressurize both side portions of the battery cell 9 and may fix the battery cell 9 to the seating plate 20. Accordingly, at least two of the pressurizing and fixing portion 30 may be spaced apart from each other by a predetermined distance. For example, two pressurizing and fixing portions 30 may be disposed to face each other on both sides of the seating plate 20.

Each pressurizing and fixing portion 30 may be configured to move by a predetermined distance. For example, the pressurizing and fixing portion 30 may be configured to move up and down in a vertical direction (X direction in FIG. 3) by the second moving portion 52. Accordingly, the pressurizing and fixing portion 30 may partially pressurize the battery cell 9 and may fix the battery cell 9 to the seating plate 20.

Also, the pressurizing and fixing portion 30 may be configured to linearly move in a horizontal direction toward the center of the seating plate 20 (Y direction in FIG. 3) by the first moving portion 51. In this case, since the distance between the two pressurizing and fixing portions 30 may be adjusted to be close or to be away from each other, such that, when battery cells of different sizes are transferred, the battery cell may be fixed by adjusting the position of the pressurizing and fixing portion 30.

Each pressurizing and fixing portion 30 may include a pressurizing member 310 and a connection member 330.

The pressurizing member 310 may be a portion in contact with the battery cell 9 and pressurizing the battery cell 9. Accordingly, after at least a portion of the pressurizing member 310 may be disposed above the battery cell 9, may move down, and may pressurize the battery cell 9.

The pressurizing member 310 may be formed in a form in which a portion thereof in contact with the battery cell 9 may protrude downwardly. However, an example embodiment thereof is not limited thereto.

The pressurizing member 310 may pressurize the external side portion of the accommodation portion 910 or 930, rather than the accommodation portion 910 or 930 of the battery cell 9. For example, the pressurizing member 310 may pressurize a portion of the battery cell 9 disposed externally of a groove formed in the seating plate 20. However, an example embodiment thereof is not limited thereto.

The connection member 330 may connect the pressurizing member 310 to the second moving portion 52. The connection member 330 may be disposed to face the side of the seating plate 20, the upper end side may be fastened to the pressurizing member 310, and the lower end side may be fastened to the second moving member 522. Accordingly, the pressurizing and fixing portion 30 may move in a vertical direction along the moving path of the second moving member 522.

The pressurizing member 310 and the connection member 330 may be integrated with each other. However, an example embodiment thereof is not limited thereto, and the pressurizing member 310 and the connection member 330 may be manufactured separately and may be coupled to each other so as to be separated if desired.

One end of a first elastic member 71 described below may be coupled to the connection member 330. To this end, a coupling protrusion may be provided in the connection member 330. The coupling protrusion may be formed in the form of a protrusion protruding from the connection member 330 to the outside. The coupling protrusion may be disposed on the opposite side of the connection member 330, rather than on the side opposing the seating plate 20, and a plurality of coupling protrusions may be provided to correspond to the number of the first elastic members 71.

Also, a protrusion 35 may be provided in the connection member 330. The protrusion 35 may protrude outwardly from the connection member 330, and a bearing may be provided on an end thereof. For example, the protrusion 35 may be configured in the form of a cam follower.

The protrusion 35 may be coupled to a process device for performing the process of manufacturing a battery cell, and the position may be changed according to the driving of the process device. When the process device moves up the protrusion 35, the pressurizing and fixing portion 30 may also move up, and accordingly, the pressurizing member 310 may be spaced apart from the battery cell 9. Also, when the process device moves the protrusion 35 in the horizontal direction, the pressurizing and fixing portion 30 may move away from the seating plate 20, and accordingly, the upper portion of the battery cell 9 may be completely opened.

The first moving portion 51 may guide the movement of the pressurizing and fixing portion 30 such that the pressurizing and fixing portion 30 may linearly move in the first direction. Here, the first direction may be a direction of moving in a horizontal direction (X direction) toward the center of the seating plate 20, and may be, for example, a direction parallel to the moving direction of the carrier 1.

To this end, the first moving portion 51 may include a first guide rail 511 fixed to the base assembly 10, and a first moving member 512 coupled to the first guide rail 511 and moving back and forth along the first guide rail 511.

In the example embodiment, since the pressurizing and fixing portion 30 linearly moves in a first direction parallel to the moving direction of the carrier 1, the first guide rail 511 may be arranged in parallel with the transfer rail R of the carrier 1.

The first moving member 512 may have a groove into which the first guide rail 511 is inserted. The groove of the first moving member 512 may be formed in a complementary form to the first guide rail 511.

As the first moving member 512 is configured to move linearly along the first guide rail 511, the pressurizing and fixing portion 30 indirectly connected to the first moving member 512 may also linearly move along with the first moving member 512. Accordingly, the first moving portion 51 may define a horizontal moving path and a moving range of the pressurizing and fixing portion 30.

The other end of the first elastic member 71 and the other end of the second elastic member 72, which will be described later, may be coupled to the first moving member 512. Accordingly, coupling protrusions to which the first elastic member 71 and the second elastic member 72 are coupled may be provided in the first moving member 512.

The second moving portion 52 may guide the movement of the pressurizing and fixing portion 30 such that the pressurizing and fixing portion 30 may linearly move in the second direction. Here, the second direction may be a direction of moving up and down in a vertical direction (Z direction).

To this end, the second moving portion 52 may include a second guide rail 521 fixed to the first moving member 512, and a second moving member 522 coupled to the second guide rail 521 and moving back and forth along the second guide rail 521.

The second guide rail 521 may be disposed in a direction orthogonal to the moving direction of the carrier 1, which is the first direction, and a lower end thereof may be fixed and coupled to the first moving member 512. In this case, the upper end of the second guide rail 521 may not be connected to the seating plate 20. Accordingly, when the first moving member 512 moves, the second guide rail 521 may move together with the first moving member 512.

In the example embodiment, the second guide rail 521 may be formed in the shape of a cylindrical pillar and may be disposed between the base assembly 10 and the seating plate 20.

The second moving member 522 may be moveably coupled to the second guide rail 521, and may be fixed and fastened to the connection member 330 described above. To this end, the second moving member 522 may have a hole into which the second guide rail 521 is inserted.

As the second moving member 522 is configured to be linearly moved along the second guide rail 521, the pressurizing and fixing portion 30 connected to the second moving member 522 may also linearly move along with the second moving member 522. Accordingly, the second moving portion 52 may define a vertical moving path and a moving range of the pressurizing and fixing portion 30.

In this example embodiment, two second moving portions 52 may be disposed side by side and spaced apart from each other. For example, the second moving portion 52 may be disposed on both sides of the first guide rail 511 in a distributed manner. In this case, a second elastic member 72 described below may be disposed between the two spaced apart second moving members 522. However, an example embodiment thereof is not limited thereto.

A plurality of first elastic members 71 may be provided, and one end may be connected to the pressurizing and fixing portion 30 and the other end may be connected to the first moving member 512. The first elastic member 71 may be formed of an elastically deformable member such as a coil spring. Accordingly, when the pressurizing and fixing portion 30 moves up, a restoring force may be generated between the pressurizing and fixing portion 30 and the first moving member 512 by the first elastic member 71 in a direction in which the pressurizing and fixing portion 30 and the first moving member 512 become close to each other. The restoring force of the first elastic member 71 may act as a force by which the pressurizing and fixing portion 30 pressurizes the battery cell 9. Accordingly, the first elastic member 71 may be disposed such that an elastic restoring force may act as a force for allowing the pressurizing and fixing portion 30 to be in close contact with the seating plate 20 in the second direction.

A plurality of second elastic members (72 in FIG. 4) may be provided, and one end may be connected to the plate coupling portion 40 and the other end may be connected to the first moving member 512. The second elastic member 72 may be implemented by an elastically deformable member such as a coil spring. Accordingly, when the first moving member 512 moves in the direction away from the seating plate 20, an elastic restoring force may be generated between the plate coupling portion 40 and the first moving member 512 by the second elastic member 72 in a direction of becoming close to each other.

By the elastic restoring force of the second elastic member 72, the first moving member 512 may be maintained to be in close contact with the center of the seating plate 20. Accordingly, the second elastic member 72 may be disposed such that an elastic restoring force may act as a force for allowing the pressurizing and fixing portion 30 to become in close contact with the seating plate 20 in the first direction.

Referring to FIG. 2, the carrier 1 in the example embodiment may include a buffer member 60 and a foreign substance removing portion 80.

The buffer member 60 may be disposed in at least one of front and rear regions of the base assembly 10 and may mitigate an impact applied to the carrier 1 when colliding with another unit (e.g., another carrier).

The buffer member 60 may be formed of a material elastically deformed and mitigating impacts. For example, the buffer member may be formed of rubber or urethane. Also, the buffer may be formed in the form of a pad, block, or foam, but an example embodiment thereof is not limited thereto.

The foreign substance removing portion 80 may be fastened to the base assembly 10 and may remove foreign substances remaining on the upper surface of the driving portion 90 by being in contact with the driving portion 90 when the carrier 1 moves.

To this end, the foreign substance removing portion 80 may include a brush. The brush may be in contact with the surface of the driving portion 90 when the carrier 1 moves along the transfer rail R, and may remove foreign substances remaining on the surface of the driving portion 90.

In the description below, operations of the carrier 1 according to the example embodiment will be described.

Referring to FIG. 1, the carrier 1 may be coupled to a transfer rail R and may move along the transfer rail R through electromagnetic coupling with a driving portion 90 disposed parallel to the transfer rail R. Also, the carrier 1 may transfer the battery cells 9 to various process positions for manufacturing the battery cells 9.

As illustrated in FIG. 3, while the carrier 1 moves, the pressurizing and fixing portion 30 may continuously pressurize the battery cell 9 seated on the seating plate 20 through the restoring force provided by the first elastic member 71, and accordingly, the movement of the battery cell 9 may be fixed while the carrier 1 moves.

When the carrier 1 is disposed in one process position, an insertion member provided in a device (hereinafter, referred to as a process device) for performing the process may be inserted into the insertion groove 11 of the fixing member 110. Accordingly, the movement of the carrier 1 may be prevented in the corresponding position.

Subsequently, the process device may move up the protrusion 35 of the carrier 1 in the second direction. In this case, the pressurizing and fixing portion 30 to which the protrusion 35 is fastened may also move up, and accordingly, the pressurizing member 310 may be spaced apart from the battery cell 9. Simultaneously or thereafter, the process device may move the protrusion 35 in the first direction such that the pressurizing and fixing portion 30 may move away from the seating plate 20. Accordingly, the upper portion of the battery cell 9 may be completely opened, such that the process may be performed smoothly.

When the process is completed, the process device may return the protrusion 35 to an original position thereof. Accordingly, the pressurizing and fixing portion 30 may pressurize the battery cell 9 again, and the battery cell 9 may be fixed to the seating plate 20. Thereafter, the carrier 1 may transfer the battery cell 9 to a subsequent process.

According to the aforementioned example embodiments, the carrier may move by electromagnetic coupling with the driving portion, individual carriers may be independently moved and controlled.

Also, the carrier does may include a driving unit for moving or fixing the battery cell. Accordingly, a cable for supplying electricity may not be connected to the carrier, such that the carrier may move without limitations in the moving distance.

While the example embodiments have been illustrated and described above, it will be apparent to those skilled in the art that modifications and variations could be made without departing from the scope of the present disclosure as defined by the appended claims.

What is claimed is:

1. A carrier, comprising:
   a base assembly movably coupled to a transfer rail;
   a seating plate disposed above the base assembly and having a battery cell seated on an upper surface thereof;
   a pressurizing and fixing portion for fixing the battery cell to the seating plate by pressurizing the battery cell;
   an elastic member for pressurizing the pressurizing and fixing portion toward the seating plate side,
   a first moving portion including a first guide rail fixed to the base assembly and a first moving member coupled to the first guide rail and moving back and forth in a first direction, which is a horizontal direction; and
   a second moving portion including a second guide rail fixed to the first moving member and a second moving member coupled to the second guide rail and moving back and forth in a second direction, which is a vertical direction,
   wherein the pressurizing and fixing portion is fixed and fastened to the second moving member; and
   wherein the pressurizing and fixing portion is coupled to the base assembly to move in the first direction and the second direction.

2. The carrier of claim 1, wherein the pressurizing and fixing portion includes:
   a pressurizing member having at least a portion disposed above the seating plate and configured to pressurize the battery cell; and
   a connection member extending from the pressurizing member and disposed to face a side surface of the seating plate.

3. The carrier of claim 1, further comprising:
   a plate coupling portion disposed between the seating plate and the base assembly and coupling the seating plate to the base assembly,
   wherein the elastic member includes:
   a first elastic member having one end fastened to the pressurizing and fixing portion and the other end fastened to the first moving member and providing an elastic restoring force in the second direction; and
   a second elastic member having one end fastened to the plate coupling portion and the other end fastened to the first moving member and providing an elastic restoring force in the first direction.

4. The carrier of claim 1,
   wherein the seating plate includes at least one groove corresponding to a shape of the battery cell, and
   wherein at least a portion of the pressurizing and fixing portion is configured to pressurize a portion of the battery cell disposed externally of the groove.

5. The carrier of claim 1, wherein at least a portion of the base assembly is disposed to face a driving portion disposed parallel to the transfer rail, and is configured to electromagnetically couple to the driving portion.

6. The carrier of claim 5, wherein the base assembly includes a magnetic unit disposed in a portion facing the driving portion.

7. The carrier of claim 5, further comprising:
   a brush coupled to the base assembly, having at least a portion in contact with a surface of the driving portion when the base assembly moves, and removing foreign substances remaining on the driving portion.

8. The carrier of claim 1, further comprising:
   a buffer member coupled to at least one of a foremost region and a rearmost region of the base assembly.

* * * * *